April 14, 1970     T. CHRISTIE ET AL     3,506,405
AUTOMATIC TITRATION INSTRUMENT
Filed Aug. 27, 1965     5 Sheets-Sheet 5

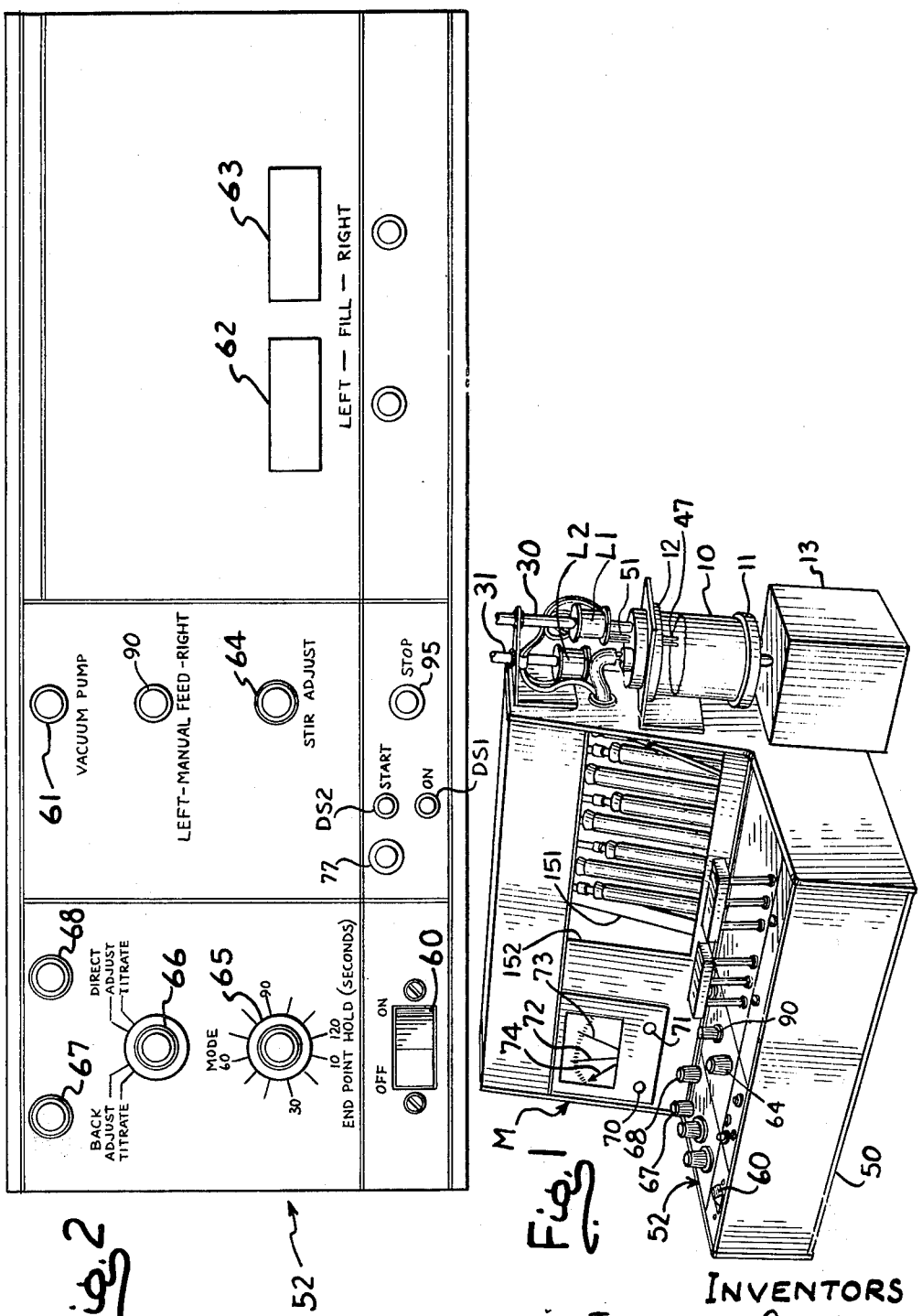

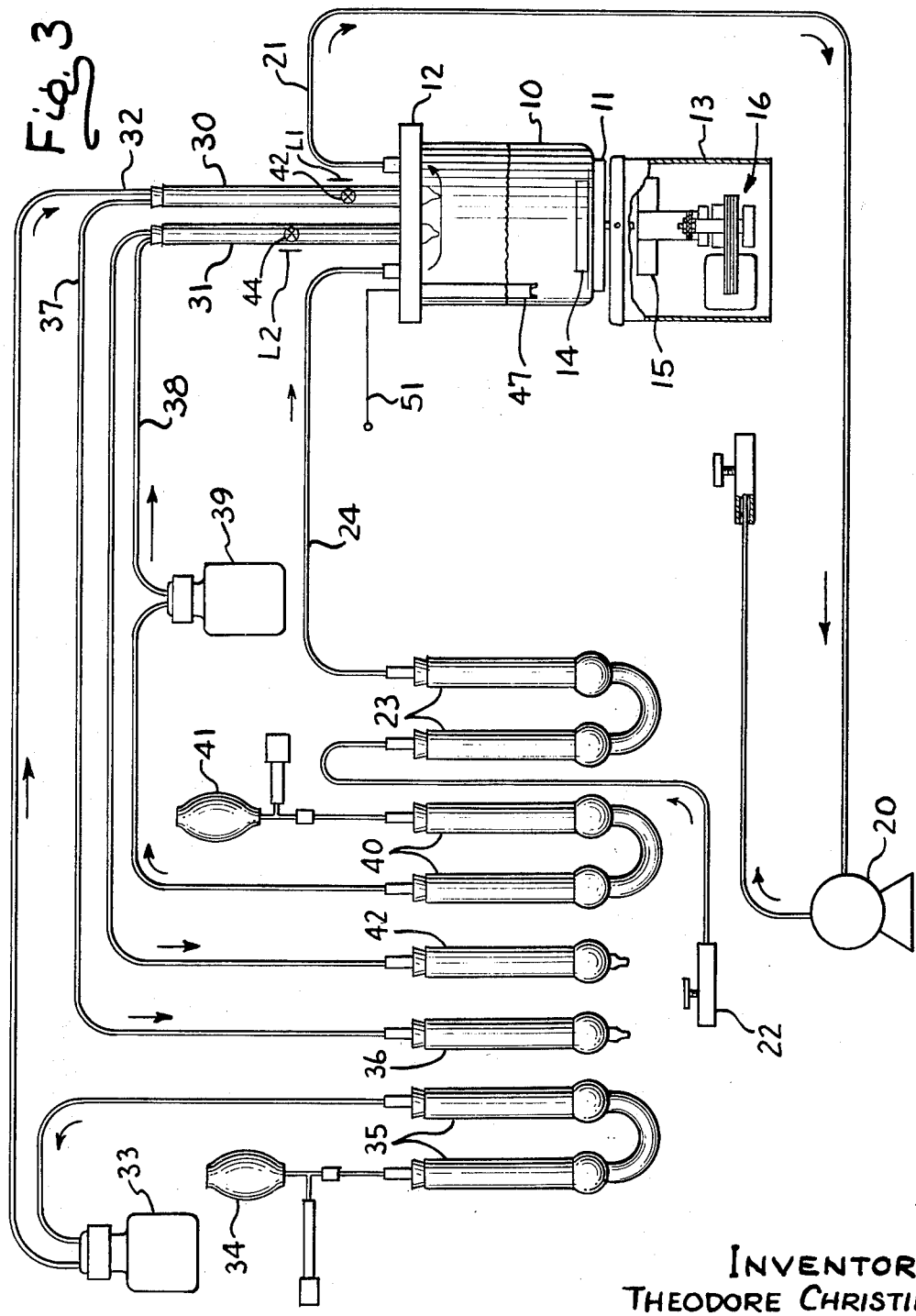

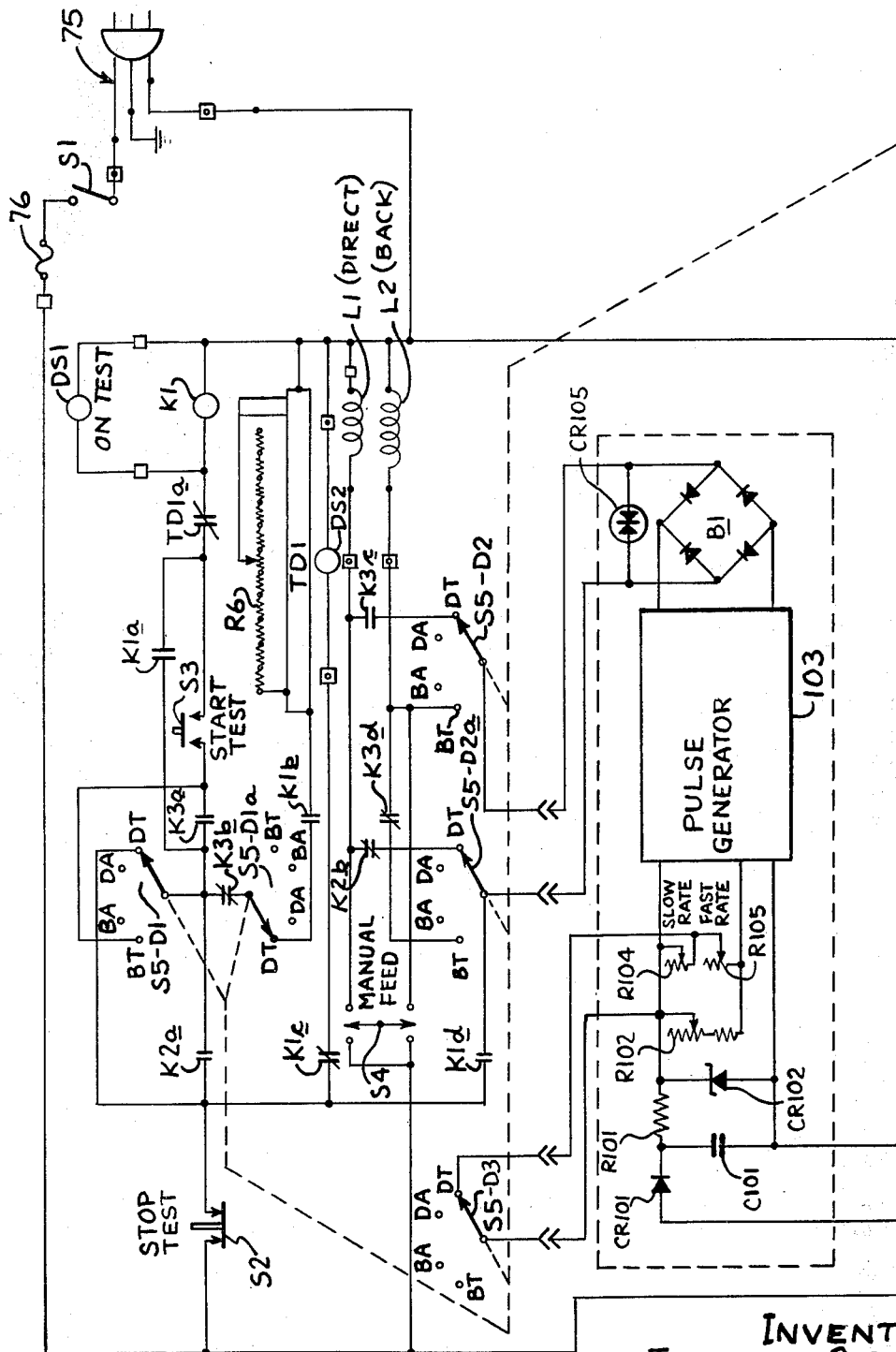

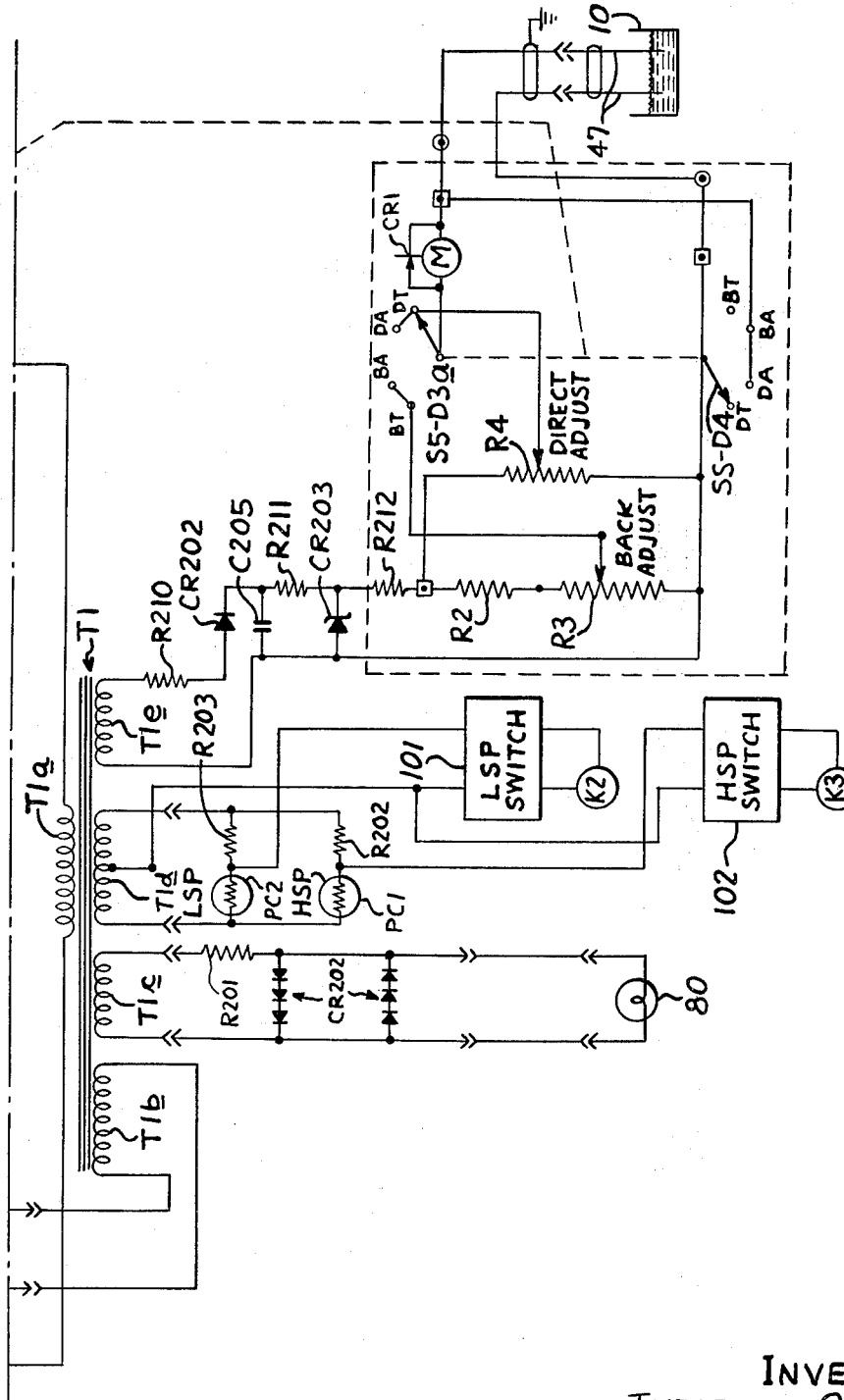

Fig. 5

| | $K_1$ | $K_2$ | $K_3$ | TDI* |
|---|---|---|---|---|
| "START" TEST LIGHT ON. CURRENT NEEDLE BELOW LOW SET POINT. | OFF | OFF | ON | OFF |
| "START" TEST LIGHT ON. CURRENT NEEDLE AT OR ABOVE LOW SET POINT. | OFF | ON | ON | OFF |
| "START" TEST LIGHT ON. CURRENT NEEDLE AT OR ABOVE HIGH SET POINT. | OFF | ON | OFF | OFF |
| "ON" TEST LIGHT ON. CURRENT NEEDLE BELOW LOW SET POINT. | ON | OFF | ON | OFF |
| "ON" TEST LIGHT ON. CURRENT NEEDLE AT OR ABOVE LOW SET POINT. | ON | ON | ON | OFF |
| "ON" TEST LIGHT ON. CURRENT NEEDLE AT OR ABOVE HIGH SET POINT. | ON | ON | OFF | ON |

* TDI EFFECTIVE ONLY IN DIRECT TITRATION MODE

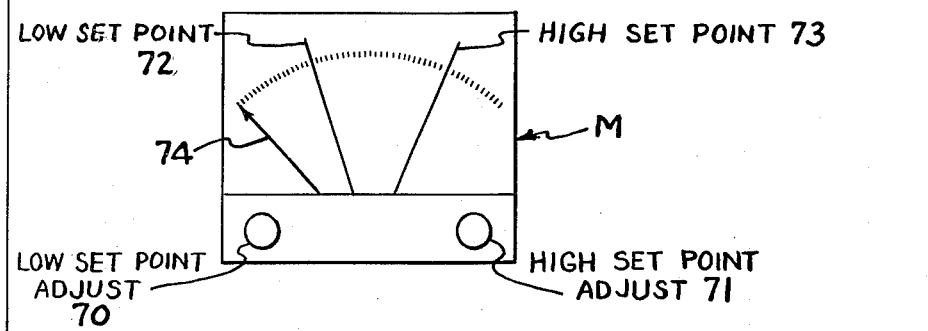

INVENTORS
THEODORE CHRISTIE
PETER JUODIKIS
by: Wolfe, Hubbard, Voit & Osann
ATTYS.

United States Patent Office

3,506,405
Patented Apr. 14, 1970

3,506,405
AUTOMATIC TITRATION INSTRUMENT
Theodore Christie and Peter Juodikis, Chicago, Ill., assignors, by mesne assignments, to Precision Scientific Company, Chicago, Ill., a corporation of Delaware
Filed Aug. 27, 1965, Ser. No. 483,044
Int. Cl. G01n 29/02, 31/00, 31/16
U.S. Cl. 23—253                                                   12 Claims

ABSTRACT OF THE DISCLOSURE

An automatic titration instrument for carrying out a conductometric, moisture determination titration. The instrument includes a flow control device including an electromagnetic valve for controlling the feed rate of reagent added to the solution, and an electrode pair immersed in the solution with a potential applied across the electrode pair for detecting changes in the apparent electrical resistance of the solution. A pulse generator opens and closes the electro magnetic valve to provide an intermittent flow of reagent. The pulse width and rate are adjusted to provide the desired reagent feed rate, and the control circuit includes means for shunting the pulse generator to maintain the valve open to provide a continuous reagent feed up to a selected changeover point, after which the pulse generator is actuated to provide the intermittent reagent feed to a preselected endpoint. The reagent feed is terminated upon arrival at the endpoint.

---

The present invention relates generally to automatic titration instruments and, more particularly, to an improved automatic titration instrument which is especially suitable for carrying out a Karl Fischer, conductometric, moisture determination titration.

It is a primary object of this invention to provide an improved automatic titration instrument which is capable of carrying out either direct titration or back titration to a selected end point, and which automatically varies the reagent feed rate according to the selected end point and the particular type of titration being run. A related object is to provide such an automatic titration instrument which delivers reagent to the sample continuously up to a selected changeover point, and then intermittently for the balance of the test, with different intermittent feed rates being automatically selected for direct and back titration tests.

It is another object of this invention to provide an improved automatic titration instrument of the above type which provides means for visibly indicating progressive changes in the sample characteristic and including means for permitting manual adjustment of the selected end point during the course of the test according to the indicated changes in the sample characteristic. In this connection, it is an object of the invention to provide such an instrument which permits the operator to avoid needless test repetition by observing the course of the particular test being run and then making any desirable adjustments in the selected end point while the test is still in progress.

It is a further object of this invention to provide an improved automatic titration instrument of the foregoing type which provides means for indicating progressive changes in the sample characteristic and including means for permitting manual adjustment of the changeover point for converting from continuous to intermittent reagent feed. Thus, it is one object of the invention to provide such an instrument which permits the operator to reduce the overall testing time by continuing the continuous reagent feed for the maximum permissible period.

Still another object of the present invention is to provide an improved automatic titration instrument of the type described above which includes an improved electrical control means for controlling the intermittent reagent feed. A related object of one particular aspect of the invention is to provide such an electrical control means which permits convenient adjustment of both the rate and volume of successive reagent drops during the intermittent feeding stage. Another related object is to provide such an electrical control means which automatically selects different intermittent reagent feed rates for direct and back titrations.

A further objective of the invention is to provide an improved automatic titration instrument in which a maximum number of parts are contained within a compact housing thereby rendering the instrument more convenient to operate and reducing the chances of accidental breakage or spilling and the like.

In one particular aspect of the invention, it is an object to provide an automatic titration instrument of the type described above which includes means for automatically providing a dry atmosphere in the headspace of the sample reaction vessel. Still another specific object is to provide such an instrument in which the reagent burettes are completely enclosed so as to eliminate the possibility of leaks, contamination and the like such as often occurs through manually operated stop cocks for example.

Other objects and advantages of the invention will become apparent upon reading the following detailed description and upon reference to the drawings in which:

FIGURE 1 is a perspective view of an automatic titration instrument embodying the present invention;

FIG. 2 is an enlarged plan view of the control panel on the instrument of FIGURE 1;

FIG. 3 is a somewhat schematic diagram of the fluid flow lines in the instrument of FIGURE 1;

FIGS. 4a and 4b form a schematic diagram of the electrical control and sensing circuitry in the instrument of FIGURE 1; and FIG. 5 is a view of the face of the indicating meter in the instrument of FIGURE 1 accompanied by a table which outlines conditions of the electrical circuitry during different operating modes.

While the invention is susceptible of various modifications and alternative forms, certain specific embodiments thereof are shown by way of example in the drawings and will herein be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims.

Although the illustrative titration instrument is capable of carrying out a number of different titrations, it is especially suitable for performing a Karl Fischer, conductometric, moisture determination titration. Briefly stated, the Karl Fischer titration reacts the moisture in the sample with a reagent consisting of a mixture of pyridine-sulphur dioxide and iodine-methanol solutions to give an apparent resistance change in the sample due to a depolarization effect on an electrode pair immersed in the sample. For samples that react slowly or contain excessive moisture, sufficient reagent is initially added to react with all the moisture, and the sample is then "back" titrated with a water methanol solution. In either the direct or back titration, the change in apparent resistance of the sample can be conveniently monitored by measuring the change in current flow through the electrode pair as the reagent is progressively added to the sample.

Turning now to the drawings, the illustrative instrument includes a reaction vessel 10 for holding the solution sample to be tested. After the solution sample has been placed into the reaction vessel 10, the vessel is placed on a turntable 11 directly under a sealing gasket 12, and the turntable 11 is then elevated by rotation in its threaded mounting so as to raise the reaction vessel until the upper edge thereof presses firmly against the sealing gasket 12 thereby sealing the reaction vessel from the surrounding atmosphere. The threaded mounting for the turntable 11 is formed in the top of a small housing 13 which contains the drive motor for the sample stirrer. Thus, a magnetic stirring bar 14 is disposed on the bottom of the reaction vessel 10 for cooperation with a corresponding magnetic drive bar 15 which is rotated in a horizontal plane by means of conventional drive motor 16. As the drive bar 15 is rotated, it is followed by the magnetic stirring bar 14 due to the magnetic coupling between the two bars. To render the stirring bar 14 inert to the sample in the reaction vessel, the bar is conventionally coated with an inert material, such as "Teflon" for example. Magnetic stirring mechanisms of this type are well known to those skilled in the art and, therefore, further details of the same need not be set forth herein. To facilitate initial location of the reaction vessel, as well as cleaning and assembling operations, the housing 13 is preferably hinged on the side of the main instrument housing so that it can be swung away from beneath the sealing gasket 12.

For the purpose of eliminating any moisture from the headspace within the reaction vessel 10, a vacuum pump 20 is provided for withdrawing the humid air from the headspace through a line 21 and replacing the withdrawn air with dry air drawn from an intake valve 22 through a pair of drying columns 23 and a feed line 24. Thus, the vacuum pump 20 serves to purge the reaction vessel headspace of humid air which can seriously affect the results of titration tests for determining the moisture content of solution samples.

In order to supply the desired reagent for the titration test, a pair of burettes 30 and 31 extend through the sealing gasket 12 with the tips of the burettes terminating within the reaction vessel headspace. Two burettes are provided because different reagents are normally required for direct and back titration. Thus, the burette 30 is connected through a line 32 to a reservoir 33 of a suitable reagent for direct titration test. Reagent is expelled from the reservoir 33 by means of dry air forced into the reservoir headspace by means of a conventional squeeze bulb 34. The air from the squeeze bulb 34 is dried by passing through drying columns 35 before it enters the headspace of the reagent reservoir 33. Dry air is also maintained in the headspace of the burette 30 by means of a drying column 36 through which any atmospheric air must pass before entering the burette headspace through line 37.

The fluid system associated with the back titration burette 31 is similar to that described for the direct titration burette 30. Thus, liquid reagent is fed into the burette 31 through a line 38 from a reagent reservoir 39, with the reagent being expelled from the reservoir 39 by means of air forced through a pair of drying columns 40 by means of a squeeze bulb 41. Air entering the headspace of the burette 31 is dried by means of a drying column 42.

In accordance with one aspect of the present invention, the reagent feed from the burettes 30 and 31 is controlled by means of magnetic valves which are completely sealed in glass so as to eliminate the possibility of any air leakage from the atmosphere. Thus, the burette 30 is provided with an enclosed magnetic valve 42 which is controlled by a surrounding coil L1 disposed outside the burette 30. Similarly, the back titration burette 31 is provided with a magnetic valve 44 which is controlled by means of a surrounding coil L2. Both the control coils L1 and L2 are operatively connected to an electrical control circuit to be described in more detail hereinafter. Electromagnetically controlled burettes of this type are commercially available, a typical example being the F-1420 "Fabco Electromagnetic" burette made by Houston Glass Fabricating Company.

For the purpose of sensing changes in the solution sample in the reaction vessel 10 as a desired reagent is added thereto, a conventional platinum electrode pair 47 is immersed in the solution sample, with a suitable conductor 51 being passed through the sealing gasket 12 to connect the electrode pair to the associated electrical control circuitry to be described below.

In accordance with another aspect of this invention, the entire electrical control system and a substantial portion of the fluid flow system is contained within a single compact housing with all the manual controls being mounted on a single convenient control panel. Thus, as shown most clearly in FIGURE 1, a small compact housing 50 contains an indicating meter M and all the electrical control circuitry therewith. In addition, the housing contains all the previously described drying columns 23, 35, 36, 40 and 42, as well as the squeeze bulbs 34 and 41 for controlling the reagent supply to the externally mounted burettes 30 and 31. Finally, the housing 50 also contains the vacuum pump 20 for purging the reaction vessel headspace. Thus, it can be seen that only the reaction vessel, the stirring assembly, the burette assemblies, and the reagent reservoir bottles need be mounted outside the main instrument housing thereby substantially reducing the chances of accidental breakage or spilling and the like. Moreover, since the bulk of the electrical and fluid flow control systems are contained within the housing 50, the instrument is much simpler and more convenient to operate than automatic titration instruments available heretofore.

As another feature of the invention, all the drying columns are mounted on a single rack which is exposed to the instrument operator through an opening in the front of the instrument housing. Thus, the aforedescribed drying columns 23, 35, 36, 40 and 42 are all mounted on an inclined rack 151 mounted within the housing 50 adjacent an opening 152 formed in the vertical front section of the housing. Consequently, the drying columns are always exposed to the view of the operator so that he can observe color changes in the packing material to determine when any particular column should be replaced.

Turning next to the instrument control panel, all the manual controls (except two knobs for adjusting the meter set points) are mounted on a single control panel which is shown most clearly in the enlarged plan view of FIGURE 2. When the operator wishes to start a titration test, he first turns the instrument on by pressing a main on-off button 60. This supplies power to the vacuum pump 20 which the operator can actuate by pressing a "vacuum pump" button 61 for the purpose of purging humid air from the headspace of the reaction vessel 10. In order to fill the two burettes 30 and 31 with liquid reagents, the operator presses two plungers 62 and 63 which are mechanically coupled to the squeeze bulbs 34 and 41 within the instrument housing. Thus, the left plunger 62 extends within the housing to engage the squeeze bulb 34 for supplying reagent to the direct titration burette 30, while the right plunger 63 operates the squeeze bulb 41 for supplying reagent to the back titration burette 31. The operator may also adjust the sample stirring rate by turning a "stir adjust" knob 64 for controlling the speed of the stirrer drive motor 16, which in turn controls the speed of rotation of the drive bar 15 and the magnetically coupled stirring bar 14.

After the operator has performed the above-described preliminary operations, he selects an end point holding period within the range of about 10 to 120 seconds by turning an "end point hold" dial 65. As will be described in more detail below, the instrument automatically resumes titrating if the end point fades within the particular end point holding period set on the dial 65. The operator must also select the operating mode, i.e., direct or back titration, for the particular test to be run. This is accomplished by turning a "mode" knob 66 to either a "direct" or "back" setting. In order to calibrate the meter M, the operator initially turns the knob 66 to the "adjust" position under the selected mode and calibrates the meter by turning a corresponding knob 67 or 68.

Thus, if a direct titration test is to be run, the operator initially turns the knob 66 to the "adjust" position on the "direct" side of the dial and calibrates the meter by turning the knob 68. After the meter has been calibrated, the operator turns the knob 66 to the "titrate" position on the "direct" side of the dial.

In accordance with one important aspect of this invention, means are provided for visibly indicating changes in the desired characteristic of the solution as the test proceeds, and means are also provided for adjusting, during the course of the test, the selected end point and also a selected changeover point where the reagent feed is converted from a continuous feed to an intermittent feed. Thus, the meter M is mounted on the front of the instrument for indicating changes in the desired characteristic of the solution, and two set point knobs 70 and 71 are provided on the meter for adjusting the selected changeover point and end point, respectively. The effect of these selected set points on the automatic operation of the instrument will be described in more detail below, but it should be noted here that the two set point knobs 70 and 71 control the position of a pair of corresponding needles on the face of the instrument. Thus, the low set point knob 70 controls the position of a low set point needle 72, while the high set point knob 71 controls the position of high set point needle 73. The meter M is of a conventional type and includes a meter overload protection diode CR1 and a pair of photocells operatively associated with the two set point needles 72 and 73. Thus, whenever the main meter pointer 74 comes into register with one of the set point needles 72 or 73, one of the photocells responds by actuating a corresponding switching network as described in more detail below.

Turning now to the simplified circuit diagram shown in FIGS. 4a and 4b for a detailed description of the electrical control means, power for operating the control circuit and the electromagnetic burette valves is supplied from a conventional A-C supply line 75 through a conventional fuse 76 and a line switch S1 which is manually controlled by the "on-off" button 60 on the instrument control panel 52. When the line switch S1 is closed by depression of the "on" side of the button 60, a "start test" light DS2 (FIG. 4a) mounted on the control panel 52 is immediately activated, and power is supplied to the control circuitry shown in FIG. 4a and to the primary winding T1a of a transformer T1 shown in FIG. 4b.

As mentioned previously, one of the preliminary settings made by the instrument operator is to set the "mode" knob 66 for either a "direct" or "back" titration operating mode. As the knob 66 is turned, it controls a selector switch S5 including seven different decks with each deck having four positions corresponding to the four positions indicated by the indicia for the knob 66 on the control panel 52. That is, each deck has "back titration," "back adjust," "direct adjust," and "direct titration" positions, abbreviated in FIGS. 4a and 4b as BT, BA, DA, and DT. The various decks of the selector switch S5 are designated S5–D1, D1a, D2, D2a, D3, D3a, and D4 in FIGS. 4a and 4b, with a broken line representing the mechanical interconnections between the different decks.

In order to adjust the meter M to full scale before starting any given test, the operator turns the knob 66 to the "adjust" position for the particular operating mode desired. The "adjust" positions for the selector switch S5 represent open terminals at every switch deck except decks D3a and D4. When the switch S5 is set at the DA position, decks D3a and D4 connect the meter M across a secondary winding T1e of the transformer T1 via the adjustable contact of a potentiometer R4. The adjustable contact of the potentiometer R4 is manually controlled by the "direct adjust" knob 68 on the instrument control panel 52 so that the operator can adjust the meter to full scale by turning the knob 68. When the switch S5 is set at the BA position, decks D3a and D4 connect the meter M across the secondary winding T1e via the adjustable contact of a potentiometer R3, which is manually controlled by the "back adjust" knob 67 on the control panel 52 for adjusting the meter to full scale. The voltage applied across the meter M during the full scale adjustment is controlled by a pair of dropping resistors R211 and R212, and a resistor R2 in series with the potentiometer R3. This circuit also includes the conventional rectifying diode CR202, current-limiting resistor R210, filtering capacitor C205, and a voltage-regulating Zener diode CR203.

After the operator has adjusted the meter M to full scale, the knob 66 and thus the selector switch S5 is set to either the "direct titration" (DT) or the "back titration" (BT) position. This conditions the instrument for operation in either the direct titration or back titration mode by making appropriate settings at each of the seven different switch decks.

For the purpose of selecting an end point hold period for the particular titration test to be run, the operator also sets the "end point hold" dial 65 prior to starting the test. This dial 65 is connected to the contact on a potentiometer R6 which determines the desired holding period to be measured by a time delay relay TD1. As will be seen from the ensuing discussion, the time delay relay TD1 in effect causes the instrument to resume titrating if the end point fades within the period set by the dial 65 and the potentiometer R6.

In order to select an end point for the particular titration test to be run, the operator turn the "high set point adjust" knob 61 on the meter M so as to set the corresponding high set point needle 73 on the meter at the selected end point. For the purpose of terminating the reagent feed when the selected end point is reached, the high set point needle is operatively associated with a corresponding high set point photocell PC1 (FIG. 4b), which is conventionally included as a part of the optical meter M. Similarly, in order to select the desired changeover point where the reagent feed is converted from the continuous to the intermittent mode, the operator turns a "low set point adjust" knob 70 which sets the corresponding low set point needle 72 operatively associated with a second photocell PC2, which is also an integral part of the optical meter M. The operation of these photocells in conjunction with the rest of the control circuit will be described in more detail below.

After all the aforedescribed settings have been made on the front of the instrument, the operator presses a "start test" button 77 on the control panel 52 so as to close a corresponding start test switch S3 in the instrument control circuit. This switch S3 is a momentary switch so that it opens as soon as the button is released by the operator.

In accordance with one important aspect of this invention, a pulse generator is operatively associated with the electromagnetic burette valves for opening and closing the valves to provide an intermittent flow of reagent, and electrical control means are operatively associated with the pulse generator to shunt the generator and maintain the burette valves continuously open to provide a continuous reagent feed up to a preselected changeover point, and then actuate the pulse generator to provide an intermittent reagent feed up to a preselected end point. The electrical control means also includes means for terminatnig the reagent feed upon arrival at the end point. Thus, the preselected changeover point and end point are selected by the settings of the two set point needles 72 and 73 on the meter M. Referring to FIGS. 4b and 5, when the meter pointer 74 reaches the low set point determined by the first set point needle, a photocell PC2 responds by actuating a corresponding low set point switching network 101, which in turn actuates a relay K2 to convert from continuous to intermittent reagent feed. Similarly, when the meter pointer 74 reaches the high set point determined by the second set point needle, a photocell PC1 responds by actuating a corresponding high set point switching network 102, which in turn actuates a relay K3 to terminate the reagent feed. Thus, it can be seen that the condition of all circuits controlled by relays K2 and K3, which in turn are controlled by the meter photocells PC1 and PC2, is dependent upon the position of the meter pointer 74 relative to the two set point needles 72 and 73. A light source 80 within the optical meter M derives power from a secondary winding T1c of the transformer T1 through a voltage dropping resistor R201 and across a pair of oppositely facing series arrangements of diodes CR202.

The pulse generator for providing the intermittent reagent feed is represented by the block 103 in FIG. 4a, and may be of a conventional design. Power is supplied to the pulse generator 103 from a secondary winding T1b of the transformer T1 through a conventional rectifying diode CR101, a voltage-limiting resistor R101, a filtering capacitor C101, and a voltage-regulating Zener diode CR102. Line transient protector diodes CR105 are connected across the generator output. In order to provide a continuous reagent feed whenever the meter pointer is below the low set point determined by the first set point needle, the generator 103 is shunted so that the appropriate burette control coil L1 or L2 is continuously energized to maintain the burette valve continuously open. When the meter pointer reaches the low set point, the circuit which shunts the generator 103 is opened, and the generator is actuated to supply a train of energizing pulses via a full wave rectifying bridge network B1 to the burette control coil, thereby alternately opening and closing the burette valve in accordance with the pulse rate and width. Specific circuitry for carrying out these functions will be described in detail below. It will be appreciated at this point, however, that the control system provided by this invention is extremely flexible and permits the operator to greatly reduce the required testing time. Thus, the operator can observe the progress of the test as indicated by the meter needle, and can make appropriate adjustments of the changeover point represented by the low set point while the test is in progress, thereby continuing the continuous reagent feed for the maximum interval. Moreover, the operator has the same flexibility with respect to the titration end point.

In order to facilitate an understanding of the illustrative embodiment of the electrical control system, the condition of the various relays for different positions of the meter pointer relative to the set point needles, both before and after the start test switch S3 has been closed, is outlined in tabular form in FIG. 5 as an example when in the direct titration mode. When the "start test" pilot light DS2 is on and the meter pointer or "current needle" is below the low set point, the only relay which is energized is relay K3. The preliminary energization of the relay K3, which is effected automatically at the termination of each test, serves a number of functions. First, relay contacts K3a are closed so as to connect the start test switch S3 to the main A-C supply line when the switch S5 is set at the DT position. Secondly, relay contacts K3b are opened so as to open the circuit to time delay relay TD1 until the high set point is reached. Next, relay contacts K3c are closed to connect the output from the pulse generator to the actuating coil L1 for the direct titration burette 30, while contacts K3d are opened to open the generator shunt circuit to the actuating coil L2 for the back titration burette 31.

If the electrical resistance of the particular sample in the reaction vessel is such that the pointer of the current meter immediately advances past the low set point determined by the first needle 72, then the meter photocell PC2 is actuated as the meter pointer passes the low set point so as to trigger the associated switching circuit 101 and thereby energize relay K2. The relay K3 remains energized because the other meter photocell PC1 is not affected until the meter pointer reaches the high set point, and the other relays K1 and TD1 remain deenergized. Consequently, only relays K3 and K2 are energized when the meter pointer is between the low and high set points, as can be seen from FIG. 5. The energization of relay K2 opens contacts K2b so as to open the generator shunt circuit to the direct titration burette actuating coil L1 and thereby connect the power input from switch deck D2a to the pulse generator 103. Consequently, when the start test switch S3 is subsequently closed, the pulse generator 103 will be actuated immediately so as to effectively bypass the continuous reagent feed stage and go immediately into the intermittent reagent feed stage.

When the pointer of the meter M is initially past the high set point, even before the titration is started, the meter photocell PC1 immediately triggers the second switching network 102 to deenergize the relay K3. The deenergization of the relay K3 opens the circuit to the start test switch S3 so that titration can never be started. Then as the meter pointer drops back past the two set points when the moisture bearing sample is added, the two photocells PC1 and PC2 successively trigger the two switching networks 101 and 102 to reset the circuit to its original condition. That is, relay K2 is deenergized and relay K3 is energized so that all relays are again in the conditions represented in the first row of the table in FIG. 5.

Assuming that the pointer of the meter M remains below the low set point when the line switch S1 is closed, then the circuit remains in the condition represented by the first row of the table in FIGURE 5. The operator then depresses the momentary start test switch S3 which immediately activates the "on test" light DS1 and energizes the relay K1 through normally-closed contacts TD1a. The relay K1 serves a number of functions, one of which is to close normally-open contacts K1a for the purpose of shunting the start test switch S3 and thereby locking the relay K1 into the circuit through its own contacts. Relay K1 also closes normally-open contacts K1b so as to condition the time delay relay TD1 for subsequent energization. Time delay relay TD1 is not energized at this time because the relay contacts K3b are still open due to the energization of relay K3. In order to turn off the "start test" pilot light DS2, the relay K1 opens normally-closed contacts K1c. Finally, in order to initiate the continuous reagent feed to the solution being titrated, the relay K1 closes normally-open contacts K1d, thereby supplying power through normally closed contacts K2b to the control coil L1 for the direct titration burette. It will be appreciated that as long as the contacts K1d and K2b remain closed, the pulse generator 103 is effectively shunted so that power is supplied continuously to the control coil L1 to maintain the flow control valve in the associated direct titration burette in a continuously open state, thereby maintaining a continuous reagent feed from that burette.

The continuous flow of a reagent into the solution being titrated continues until the pointer of the meter M reaches the low set point. As the pointer comes into register with the low set point needle, the corresponding photocell PC2 triggers the switching circuit 101 and thereby energizes the associated relay K2 so as to open the normally-closed contacts K2b. This opens the shunting circuit around the pulse generator 103, and actuates the pulse generator 103 through closed relay contacts K1d and K3c (relays K1 and K3 remain energized). The pulse generator then produces a pulse output which is applied to the direct titration burette control coil L1 so as to alternately open and close the direct titration burette, thereby providing an intermittent reagent feed.

In accordance with one aspect of this invention, the pulse generator circuit includes means for selecting a fast intermittent reagent feed rate for the direct titration mode, and a slow intermittent reagent feed rate for the back titration mode. Thus, the pulse generator is associated with a pair of potentiometers R104 and R105 which are operatively connected to the deck D3 of the mode selection switch S5. When the selection switch S5 is set for the direct titration mode, the deck D3 functions to shunt the potentiometer R104 so as to cause the pulse generator 103 to produce a pulse output at a relatively fast rate. This direct titration pulse rate may be adjusted by means of the potentiometer R105, with a typical rate being about one pulse per second. As will be described in more detail below, when the switch S5 is set for operation in the back titration mode, the shunting circuit is open so that both potentiometers R104 and R105 are connected into the pulse generator circuit to provide a slow pulse rate output, typically about one pulse per twenty seconds. The amount of reagent passed through the burette for each pulse depends on the pulse width, which is typically about 0.1 second. This is sufficient to pass about 0.02 cc. of reagent for each pulse. To permit adjustment of the pulse width, a potentionmeter R102 is provided in the input circuit to the pulse generator.

The intermittent reagent feed continues until the meter pointer 74 reaches the high set point, at which time the high set point photocell PC1 triggers the switching circuit 102 to reenergize the relay K3. The relay K3 functions to terminate the test by opening the contacts K3c, thereby opening the circuit between the pulse generator 103 and the direct titration burette control coil L1. Since relay K2 remains energized, contacts K2b remain open so that the coil L1 cannot be energized through the shunting circuit around the pulse generator.

For the purpose of providing an end point holding period during which any tendency of the end point to fade due to slow reaction rates is compensated by further titration, the deenergizing of relay K3 closes contacts K3b so as to supply power to the time delay relay TD1. The exact time period required for this relay to become conductive is determined by the particular setting made on the potentiometer R6 by the "end point hold" dial 65 on the instrument control panel. This holding period is typically within the range of about 10 to 120 seconds. If the pointer 74 drops below the high set point 73 before the completion of the selected "end point hold" time, the time cycle will repeat when the pointer 74 again reaches the high set point 73. At the end of the selected holding period, the time delay relay TD1 is energized and thereby opens normally-closed contacts TD1a to deenergize the relay K1 and turn off the "on test" pilot light DS1. Relay contacts K1c are closed to turn on the "start test" light DS2. The deenergizing of relay K1 also opens contacts K1a, K1b and K1d to reset the circuit for the next test. Thus, contacts K1a open the shunt circuit around the start switch S3, contacts K1b deenergize the time delay relay TD1, and contacts K1d open the power supply line to the burette control coils L1 and L2.

In order to complete the resetting of the circuit, it is necessary to deenergize relay K2 and energize K3. This is accomplished by the return of the pointer of the meter M to its zero position when a new sample is added. That is, when the pointer drops back past the high set point, it actuates photocell PC1 to trigger switching circuit 102 to energize relay K3. Similarly, when the pointer drops past the low set point, it actuates photocell PC2 to trigger the switching circuit 102 to deenergize relay K2. The instrument is then ready for the next test.

For operation in the back titration mode, the selector switch is set to the BT position, after initial calibration at the BA position. In this case, the meter pointer 74 moves from right to left during the titration so that the low set point needle 72 determines the titration end point, while the high set point needle 73 determines the changeover point, i.e., just the reverse from the direct titration mode. In order to add sufficient reagent to the solution sample initially to react with all the moisture in the sample, a "manual feed" lever 90 on the instrument panel 52 is manually actuated to close a manual feed switch S4 (FIG. 4a) in the main control circuit. The switch S4 shunts the pulse generator 103 and supplies power directly from the A-C supply 75 to one of the burette control coils L1 or L2, depending on which direction the operator pushes the lever 90. As long as the switch S4 is held in the closed position, of course, the selected burette is maintained in the open condition to supply reagent continuously to the solution sample. The operator continues this manual feeding operation until the meter pointer 74 has advanced to the upscale end of the meter. In a typical case, the high set point needle 73 will be about 0.5 microampere below the meter pointer.

After the manual reagent feeding operation has been completed, the instrument is ready to perform an automatic back titration test. In this operating mode, deck D1 of the selector switch S5 is in the BT position so that the start test switch is in circuit with normally-open contacts K2a rather than K3a. Since the meter pointer in this case is normally above the high set point at the start of the test, K2 is initially energized (see FIG. 5), and thus contacts K2a are initially closed. Consequently, when the start test switch S3 is closed, power is supplied through normally-closed contacts TD1a to energize relay K1 in the same manner as in the direct titration mode. The energization of relay K1 opens normally-closed contacts K1c to turn off the "start test" pilot light DS2, and closes contacts K1d to supply power through switch deck D2a normally-closed contacts K3d to the control coil L2 for the back titration burette. It will be appreciated that as long as the contacts K1d and K3d remain closed, the pulse generator 103 is effectively shunted so that power is supplied continuously to the control coil L2 to maintain the flow control valve in the associated back titration burette in a continuously open state, thereby providing a continuous reagent feed from that burette.

The continuous flow of reagent into the solution being back titrated continues until the pointer of the meter M drops back to the high set point. As the pointer 74 comes into register with the high set point needle 73, the corresponding photocell PC1 triggers the associated switching circuit 102 to energize relay K3. This opens relay contacts K3d and closes contacts K3c, thereby opening the shunt circuit around the pulse generator 103 and actuating the pulse generator. Consequently, the back titration control coil L2 is energized by the pulse output from the generator 103 so as to provide an intermittent reagent feed by alternately opening and closing the back titration burette control valve.

The intermittent reagent feed continues until the meter pointer 74 drops down to the low set point, at which time the low set point photocell PC2 triggers the switching circuit 101 to deenergize relay K2. The relay K2 functions to terminate the test by opening the contacts K2a and thereby deenergizing relay K1 and turning off the "on test" pilot light DS1. Deenergization of relay K1 turns off the power to the generator 103 and resets the instrument for the next test; thus, contacts K1d open the power supply line to the burette control coils L1 and L2, contacts K1a open the shunt circuit around the start test switch S3, and contacts K1c turn on the "start test" light DS2.

If the next test is another back titration test, the resetting of the instrument is completed when the meter pointer is advanced to its upscale position by the manual reagent feeding operation. Thus, when the pointer 74 passes the low set point, it energizes relay K2, and when it passes the high set point, it deenergizes relay K3. Thus, at the time the automatic back titration test is started, the instrument has been restored to the back titration starting conditions described above.

Since an end point holding period is generally not required in a back titration test, deck D1a of the selector switch S5 opens the circuit to the time delay relay TD1 when set to the BT position. Consequently, the relay TD1 is never energized to initiate a holding period.

For the purpose of providing a relatively slow reagent feed rate during the intermittent feed stage, deck D3 of the selector switch S5 opens the shunting circuit around the potentiometer R104 when set to the BT position. Thus, both potentiometers R104 and R105 are connected into the generator input circuit to reduce the pulse output rate to about one pulse per twenty seconds. This rate can be adjusted by means of the movable contacts on the potentiometers R104 and R105.

In order to permit the operator to stop an automatic test at any time, a "stop" button 95 is mounted on the instrument control panel 52 for opening a "stop test" switch S2 (FIG. 4a). The switch S2 is connected in the power supply line to the relay K1, so that manual opening of the switch S2 immediately terminates the test in progress and resets the instrument for the next test in the same manner described above in connection with the automatic operating modes.

As can be seen from the foregoing detailed description, the present invention provides an improved automatic titration instrument which is capable of carrying out either direct or back titration to a selected end point, and which automatically varies the reagent feed rate according to the selected changeover point and the particular type of titration being run. This instrument delivers reagent to the sample continuously up to a selected changeover point, and then intermittently for the balance of the test, with different intermittent feed rates being automatically selected for direct and back titration tests. The illustrative instrument includes means for visibly indicating progressive changes in the sample characteristic and means for permitting manual adjustment of the selected end point during the course of the test according to the indicated changes in the sample characteristic. Consequently, the operator can avoid needless test repetition by observing the course of the particular test being run and then making any desirable adjustments in the selected end point while the test is still in progress. Similarly, the illustrative instrument also includes means for permitting manual adjustment of the changeover point for converting from continuous to intermittent reagent feed, so that the operator can reduce the overall testing time by continuing the continuous reagent feed for the maximum permissible period. The improved electrical control circuit provided by this invention permits convenient adjustment of both the rate and volume of successive reagent additions during the intermittent feeding stage, and automatically selects different intermitent reagent feed rates for direct and back titration tests. Moreover, the particular instrument described above is considerably more convenient to operate and reduces the chances of accidental breakage by providing a maximum number of parts contained within a single compact housing. Furthermore, the inventive instrument includes means for automatically providing a dry atmosphere in the headspace of the sample reaction vessel, and the reagent burettes are completely enclosed so as to eliminate the possibility of leaks, contamination and the like which often occur through manually operated stop cocks.

We claim as our invention:

1. In an automatic titration instrument for titrating a batch of solution by the addition of a reagent, the combination comprising a flow control device including an electromagnetic valve for controlling the feed rate of the reagent being added to the solution, an electrode pair for immersion in the solution and means for applying a potential across said electrode pair for detecting changes in the apparent electrical resistance of the solution upon addition of the reagent, a pulse generator operatively associated with said electromagnetic valve for opening and closing the valve to provide an intermittent flow of reagent, the pulse width and rate being adjusted to provide a predetermined reagent feed rate, electrical control means operatively associated with said electrode pair and including means for shunting said pulse generator and maintaining said electromagnetic valve continuously open to provide a continuous reagent feed up to a preselected changeover point and then actuating said pulse generator to provide said intermittent reagent feed up to a preselected end point, said control means also including means for terminating the reagent feed upon arrival at said end point and means for automatically measuring a preselected end point holding period upon arrival at said end point and automatically resuming the reagent feed if the end point is not held for said preselected holding period.

2. In an automatic titration instrument for titrating a batch of solution by the addition of a reagent, the combination comprising a pair of flow control devices each including an electrically operable valve for controlling the feed rate of two different reagents for direct and back titration, respectively, of the solution, a pulse generator operatively associated with said electrically operable valves for opening and closing each valve at a predetermined rate to provide an intermittent flow of reagent at a predetermined feed rate, said generator including means for selecting a fast rate for one of said valves for feeding a direct titration reagent and a slow rate for the other valve for feeding a back titration reagent, an electrode pair for immersion in the solution and means for applying a potential across said electrode pair for detecting changes in the apparent electrical resistance of the solution upon addition of the reagent, and electrical control means operatively associated with said pulse generator and said electrode pair for rendering said pulse generator inoperative in response to a selected end point.

3. In an automatic titration instrument for titrating a batch of solution by the addition of a reagent, the combination comprising a flow control device including an electrically operable valve for controlling the feed rate of the reagent being added to the solution, an electrode pair for immersion in the solution and means for applying a potential across said electrode pair for detecting changes in the apparent electrical resistance of the solution upon addition of the reagent, indicating means operatively associated with said electrode pair for visibly indicating changes in the apparent electrical resistance of the solution upon addition of the reagent, electrical control means operatively associated with said flow control device and said electrode pair for feeding the reagent continuously up to a selected changeover point in the indicated resistance of the solution and then feeding the reagent intermittently up to a selected end point in the indicated resistance of the solution, said control means including means for permitting manual adjustment of the changeover point during the course of the test as suggested by fluctuations in the solution resistance indicated by said indicating means.

4. In an automatic titration instrument for titrating a batch of solution by the addition of a reagent, the combination comprising a pair of flow control devices each including an electrically operable valve for controlling the feed rate of two different reagents for direct and back titration, respectively, of the solution, an electrode pair for immersion in the solution and means for applying a potential across said electrode pair for detecting changes in the apparent electrical resistance of the solution upon addition of the reagent, indicating means operatively associated with said electrode pair for visibly indicating changes in the apparent electrical resistance of the solution upon addition of the reagent, a pulse generator operatively associated with said electrically operable valves for opening and closing each valve at a predetermined rate to provide an intermittent flow of reagent at a predetermined feed rate, said generator including means for selecting a fast rate for one of said valves for feeding a direct titration reagent and a slow rate for the other valve for feeding a back titration reagent, and electrical control means operatively assocaited with said pulse generator, said electrode pair, and said electrically operable valve, said electrical control means including means for terminating the flow of reagent to said solution in response to a selected end point, means for permitting manual adjustment of the selected end point during the course of the test as suggested by fluctuations in the solution resistance indicated by said indicating means, and means for rendering said pulse generator inoperative in response to the selected end point.

5. In an automatic titration instrument for titrating a batch of solution by the addition of a reagent, the combination comprising a pair of flow control devices each including an electrically operable valve for controlling the feed rate of two different reagents for direct and back titration, respectively, of the solution, an electrode pair for immersion in the solution and means for applying a potential across said electrode pair for detecting changes in the apparent electrical resistance of the solution upon addition of the reagent, indicating means operatively associated with said electrode pair for visibly indicating changes in the apparent electrical resistance of the solution upon addition of the reagent, a pulse generator operatively associated with said electrically operable valves for opening and closing each valve at a predetermined rate to provide an intermittent flow of reagent at a predetermined feed rate, said generator including means for selecting a fast rate for one of said valves for feeding a direct titration reagent and a slow rate for the other valve for feeding a back titration reagent, and electrical control means operatively associated with said flow control devices, said electrode pair, and said pulse generator, said electrical control means including means for feeding the reagent continuously up to a selected changeover point in the indicated resistance of the solution and then actuating said pulse generator to feed the reagent intermittently up to a selected end point in the indicated resistance of the solution, means for permitting manual adjustment of the changeover point during the course of the test as suggested by fluctuations in the solution resistance indicated by said indicating means, and means for rendering said pulse generator inoperative in response to said selected end point.

6. In an automatic titration instrument for titrating a batch of solution by the addition of a reagent, the combination comprising a pair of flow control devices each including an electromagnetic valve for controlling the feed rate of two different reagents for direct and back titration, respectively, of the solution, an electrode pair for immersion in the solution and means for applying a potential across said electrode pair for detecting changes in the apparent electrical resistance of the solution upon addition of the reagent, a pulse generator operatively associated with said electromagnetic valves for opening and closing each valve at a predetermined rate to provide an intermittent flow of reagent at a predetermined feed rate, said generator including means for selecting a fast rate for one of said valves for feeding a direct titration reagent and a slow rate for the other valve for feeding a back titration reagent, means for adjusting the pulse width and rate of the output of said pulse generator to provide an adjustable intermittent reagent feed rate, and electrical control means operatively associated with said pulse generator and said electrode pair for shunting said pulse generator and maintaining said electromagnetic valve continuously open to provide a continuous reagent feed up to a preselected changeover point and then actuating said pulse generator to provide said intermittent reagent feed up to a preselected end point, said conrol means also including means for terminating the reagent feed upon arrival at said end point and means for automatically measuring a preselected end point holding period upon arrival at said end point and automatically resuming the reagent feed if the end point is not held for said preselected holding period.

7. In an automatic titration instrument for titrating a batch of solution by the addition of a reagent, the combination comprising a flow control device including an electrically operable valve for controlling the feed rate of the reagent being added to the solution, an electrode pair for immersion in the solution and means for applying a potential across said electrode pair for detecting changes in the apparent electrical resistance of the solution upon addition of the reagent, indicating means operatively associated with said electrode pair for visibly indicating changes in the apparent electrical resistance of the solution upon addition of the reagent, and electrical control means operatively associated with said electrode pair and said flow control device, said electrical control means including means for feeding the reagent continuously up to a selected changeover point in the indicated resistance of the solution and then feeding the reagent intermittently up to a selected end point in the indicated resistance of the solution, means for permitting manual adjustment of the changeover point during the course of the test as suggested by fluctuations in the indicated solution resistance, means for terminating the flow of reagent to said solution in response to a preselected end point, and means for permitting manual adjustment of the selected end point during the course of the test as suggested by fluctuation in the indicated solution resistance.

8. In an automatic titration instrument for titrating a batch of solution by the addition of a reagent, the combination comprising a flow control device including an electrically operable valve for controlling the feed rate of the reagent being added to the solution, an electrode pair for immersion in the solution and means for applying a potential across said electrode pair for detecting changes in the apparent electrical resistance of the solution upon addition of the reagent, indicating means operatively associated with said electrode pair for visibly indicating changes in the apparent electrical resistance of the solution upon addition of the reagent, a pulse generator operatively associated with said electrically operable valve for opening and closing the valve to provide an intermittent flow of reagent, and electrical control means operatively associated with said electrode pair and said electrically operable valve, said electrical control means including means for shunting said pulse generator and maintaining said electrically operable valve continuously open to provide a continuous reagent feed up to a preselected changeover point and then actuating said pulse generator to provide said intermittent reagent feed up to a preselected end point, means for terminating the flow of reagent to said solution in response to the preselected end point, and means for permitting manual adjustment of the preselected changeover point and preselected end point during the course of the test as suggested by fluctuations in the indicated solution resistance.

9. In an automatic instrument for titrating a batch of solution by the addition of a reagent, the combination comprising at least one burette including an electromagnetic valve completely enclosed within the burette and controlled by an external electrical control coil, a reagent reservoir for supplying reagent to said burette, a reaction vessel for holding the solution to be titrated, an electrode pair for immersion in the solution and means for applying a potential across said electrode pair for detecting changes in the apparent electrical resistance of the solution upon addition of the reagent, indicating means operatively associated with said eletrcode pair for visibly indicating changes in the apparent electrical resistance of the solution upon addition of the reagent, and electrical control means operatively associated with said electrode pair and said electrical control coil and including means for energizing said control coil continuously to maintain said burette valve continuously open up to a preselected changeover point on said indicating means, and means for pulsing said control coil to alternately open and close said burette valve between said preselected changeover point and a preselected end point on said indicating means and means for automatically measuring a preselected end point holding period upon arrival at said end point and automatically resuming the reagent feed if the end point is not held for said preselected holding period.

10. In an automatic instrument for titrating a batch of solution by the addition of a reagent, the combination comprising at least one burette including an electromagnetic valve completely enclosed within the burette and controlled by an external electrical control coil, a reagent reservoir for supplying reagent to said burette, a reaction vessel for holding the solution to be titrated, an electrode pair of immersion in the solution and means for applying a potential across said electrode pair for detecting changes in the apparent electrical resistance of the solution upon addition of the reagent, indicating means operatively associated with said electrode pair for visibly indicating changes in the apparent electrical resistance of the solution upon addition of the reagent, said indicating means including first manually operable control means for setting a desired changeover point and second manually operable control means for setting a desired end point, and electrical control means operatively associated with said electrode pair and said electrical control coil, said control means including means for energizing said control coil continuously to maintain said burette valve continuously open and responsive to said first manually operable control means for deenergizing said valve at said changeover point, and means responsive to said first and second manually operable control means for pulsing said control coil to alternately open and close said burette valve between said changeover point and said end point, and means responsive to said second manually operable control means for deenergizing said control coil at said end point.

11. In an instrument for titrating a batch of solution by the addition of a reagent, the combination comprising means for supporting a reaction vessel for holding the solution to be titrated, a sealing gasket mounted directly above said supporting means with at least one burette passing through said sealing gasket for supplying reagent to the solution in the reaction vessel, an electrode pair for immersion in the solution in the reaction vessel, means associated with said electrode pair for applying potential across the electrode pair for detecting changes in the apparent electrical resistance of the solution upon addition of the reagent, said supporting means being vertically adjustable for elevating a reaction vessel placed thereon up into sealing engagement with said sealing gasket, and evacuating means associated with said sealing gasket for evacuating the air from the sealed headspace in the reaction vessel and replacing the same with dry air.

12. In an automatic titration instrument for titrating a batch of solution by the addition of a reagent, the combination comprising means for supporting a reaction vessel for holding the solution to be titrated, a pair of burettes for feeding desired reagents to the solution within the reaction vessel, a pair of reagent reservoirs for supplying reagents to said burettes, a plurality of drying columns associated with the reaction vessel, the burettes, and the reagent reservoirs for supplying dry air thereto, an instrument housing including a front opening and a transverse rack mounted within the housing adjacent said opening for supporting the plurality of drying columns within the view of the instrument's operator.

References Cited

UNITED STATES PATENTS

| | | | |
|---|---|---|---|
| 2,666,691 | 1/1954 | Robinson et al. | 23—253 |
| 2,726,936 | 12/1955 | Bernheim | 23—253 |
| 2,740,694 | 4/1956 | Frediani | 23—230 |
| 2,621,671 | 12/1952 | Eckfeldt | 137—93 X |
| 3,026,182 | 3/1962 | Jankowski et al. | 23—253 X |
| 3,421,982 | 1/1969 | Schultz et al. | 23—253 X |

JOSEPH SCOVRONEK, Primary Examiner